US008460093B2

(12) United States Patent
Jackson

(10) Patent No.: US 8,460,093 B2
(45) Date of Patent: *Jun. 11, 2013

(54) SINGLE OUTCOME GAME OF CHANCE WITH DIFFERING WAGERS VARYING AMONG MULTIPLE PAYTABLES

(75) Inventor: Kathleen Nylund Jackson, Scituate, MA (US)

(73) Assignee: IGT, Reno, NV (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/906,602

(22) Filed: Oct. 18, 2010

(65) Prior Publication Data

US 2011/0034236 A1 Feb. 10, 2011

Related U.S. Application Data

(63) Continuation of application No. 11/803,931, filed on May 16, 2007, now Pat. No. 7,828,648.

(60) Provisional application No. 60/800,812, filed on May 16, 2006.

(51) Int. Cl.
*G06F 17/00* (2006.01)

(52) U.S. Cl.
USPC .......................... 463/25

(58) Field of Classification Search
USPC .......................... 463/16–25
See application file for complete search history.

(56) References Cited

U.S. PATENT DOCUMENTS

| | | | |
|---|---|---|---|
| 4,448,419 | A | 5/1984 | Telnaes |
| 4,743,022 | A | 5/1988 | Wood |
| 5,019,973 | A | 5/1991 | Wilcox et al. |
| 5,248,142 | A | 9/1993 | Breeding |
| 5,393,067 | A | 2/1995 | Paulsen et al. |
| 5,788,574 | A | 8/1998 | Ornstein et al. |
| 5,806,855 | A | 9/1998 | Cherry |
| 5,816,915 | A | 10/1998 | Kadlic |
| 5,823,873 | A | 10/1998 | Moody |
| 5,839,730 | A | 11/1998 | Pike |
| 5,911,418 | A | 6/1999 | Adams |
| 5,911,419 | A | 6/1999 | Delaney et al. |

(Continued)

FOREIGN PATENT DOCUMENTS

| | | | |
|---|---|---|---|
| AU | 200065501 | B2 | 10/2010 |
| EP | 0945837 | A2 | 9/1999 |

(Continued)

*Primary Examiner* — Ronald Laneau

(74) *Attorney, Agent, or Firm* — Neal, Gerber & Eisenberg LLP

(57) ABSTRACT

A method of playing a wagering game that comprises the player making multiple wagers to play a single-outcome game, the multiple wagers being made on multiple predetermined paytables for said game. One single-outcome game and at least two differing paytables for said game are offered to the player. The paytables may be for different game versions or for a single game version with differing risk levels. The payback percentage of each of the said differing paytables may vary according to the amount of the wager. The player makes one wager for each predetermined paytable to be utilized in the resolve of the wagers. Multiple same paytables, multiple differing paytables or combinations thereof may be wagered for the play of a single game having a single outcome. The said single outcome is then compared to each wagered predetermined paytable, and each wager is resolved according to that same wagered predetermined paytable.

22 Claims, 3 Drawing Sheets

U.S. PATENT DOCUMENTS

| | | | | |
|---|---|---|---|---|
| 6,004,207 | A | 12/1999 | Wilson, Jr. et al. | |
| 6,062,981 | A | 5/2000 | Luciano, Jr. | |
| 6,077,163 | A | 6/2000 | Walker et al. | |
| 6,117,009 | A | 9/2000 | Yoseloff | |
| 6,155,925 | A | 12/2000 | Giobbi et al. | |
| 6,159,096 | A | 12/2000 | Yoseloff | |
| 6,159,097 | A | 12/2000 | Gura | |
| 6,186,894 | B1 | 2/2001 | Mayeroff | |
| 6,203,429 | B1 | 3/2001 | Demar et al. | |
| 6,224,483 | B1 | 5/2001 | Mayeroff | |
| 6,227,969 | B1 | 5/2001 | Yoseloff | |
| 6,231,442 | B1 | 5/2001 | Mayeroff | |
| 6,290,603 | B1 | 9/2001 | Luciano, Jr. | |
| 6,334,613 | B1 | 1/2002 | Yoseloff | |
| 6,358,147 | B1 | 3/2002 | Jaffe et al. | |
| 6,375,570 | B1 | 4/2002 | Poole | |
| 6,419,578 | B1 | 7/2002 | Moody et al. | |
| 6,425,823 | B1 | 7/2002 | Byrne | |
| 6,468,156 | B1 | 10/2002 | Hughs-Baird et al. | |
| 6,517,073 | B1 | 2/2003 | Vancura | |
| 6,568,013 | B2 | 5/2003 | Perez et al. | |
| 6,589,115 | B2 | 7/2003 | Walker et al. | |
| 6,607,195 | B2 | 8/2003 | Vancura | |
| 6,612,927 | B1 | 9/2003 | Slomiany et al. | |
| 6,702,289 | B1 | 3/2004 | Feola | |
| 6,702,675 | B2 | 3/2004 | Poole et al. | |
| 6,708,975 | B1 | 3/2004 | Fox et al. | |
| 6,712,693 | B1 | 3/2004 | Hettinger | |
| 6,746,016 | B2 | 6/2004 | Perrie et al. | |
| 6,802,775 | B2 | 10/2004 | Baerlocher et al. | |
| 6,860,810 | B2 | 3/2005 | Cannon et al. | |
| 6,939,224 | B2 | 9/2005 | Palmer et al. | |
| 7,029,395 | B1 | 4/2006 | Baerlocher | |
| 7,198,569 | B2 | 4/2007 | Wolf et al. | |
| 7,329,179 | B2 | 2/2008 | Baerlocher | |
| 7,419,429 | B2 | 9/2008 | Taylor | |
| 8,021,230 | B2 * | 9/2011 | Baerlocher et al. | 463/25 |
| 8,109,824 | B2 * | 2/2012 | Frank et al. | 463/25 |
| 8,235,801 | B2 * | 8/2012 | Tan | 463/20 |
| 8,262,465 | B2 * | 9/2012 | Lutnick | 463/25 |
| 8,371,940 | B1 * | 2/2013 | Robinson et al. | 463/39 |
| 2001/0054794 | A1 | 12/2001 | Cole et al. | |
| 2002/0002900 | A1 * | 1/2002 | Cho | 84/738 |
| 2002/0193158 | A1 | 12/2002 | Weiss et al. | |
| 2003/0207713 | A1 | 11/2003 | Taylor | |
| 2004/0017043 | A1 | 1/2004 | Moody | |
| 2004/0023713 | A1 | 2/2004 | Wolf et al. | |
| 2004/0038724 | A1 | 2/2004 | Asdale | |
| 2004/0242313 | A1 | 12/2004 | Munoz | |
| 2005/0009597 | A1 | 1/2005 | Daly | |
| 2005/0054429 | A1 | 3/2005 | Baerlocher et al. | |
| 2005/0060050 | A1 | 3/2005 | Baerlocher | |
| 2005/0070123 | A1 | 3/2005 | Hirano | |
| 2005/0096121 | A1 | 5/2005 | Gilliland et al. | |
| 2005/0096123 | A1 | 5/2005 | Cregan et al. | |
| 2005/0208992 | A1 | 9/2005 | Randall | |
| 2005/0282625 | A1 | 12/2005 | Nicely | |
| 2006/0025193 | A1 | 2/2006 | Gail et al. | |
| 2006/0040728 | A1 | 2/2006 | Fuller | |
| 2006/0046816 | A1 | 3/2006 | Walker et al. | |
| 2006/0063580 | A1 | 3/2006 | Nguyen et al. | |
| 2006/0252515 | A1 | 11/2006 | Walker et al. | |
| 2007/0021182 | A1 | 1/2007 | Gauselmann | |
| 2007/0087804 | A1 | 4/2007 | Knowles et al. | |
| 2007/0135207 | A1 | 6/2007 | Tarantino | |
| 2007/0243915 | A1 * | 10/2007 | Egozy et al. | 463/7 |
| 2007/0256540 | A1 * | 11/2007 | Salter | 84/485 R |
| 2008/0026816 | A1 | 1/2008 | Sammon et al. | |
| 2008/0102934 | A1 * | 5/2008 | Tan | 463/25 |
| 2008/0214292 | A1 | 9/2008 | Bryant et al. | |
| 2009/0029766 | A1 | 1/2009 | Lutnick et al. | |

FOREIGN PATENT DOCUMENTS

| | | | |
|---|---|---|---|
| WO | 2005010831 | A2 | 2/2005 |
| WO | 2006002241 | A2 | 1/2006 |
| WO | 2006004831 | A2 | 1/2006 |
| WO | 2007090270 | A1 | 8/2007 |

* cited by examiner

SINGLE OUTCOME GAME OF CHANCE WITH DIFFERING WAGERS VARYING AMONG MULTIPLE PAYTABLES

PRIORITY CLAIM

This application is a continuation of, and claims priority to and the benefit of U.S. Non-Provisional patent application Ser. No. 11/803,931, filed on May 16, 2007, which claims priority to and the benefit of U.S. Provisional Patent Application No. 60/800,812, filed on May 16, 2006, which are hereby incorporated by reference in their entirety.

BACKGROUND

1. Field of the Invention

The present invention relates to a wagering game suitable for use in casinos and other gaming establishments as a live action game, a slot machine game or a video poker game. The invention further relates to casino gaming wherein a single game is played to a single outcome and wherein prior to the game being played, the player has the option of placing different levels of wagers to play the game which alters payout rates according to multiple differing paytables.

2. Background of the Art

Games of chance have been popular for centuries. In the past twenty years, however, the opportunities to wager on such games have multiplied enormously due to the increase in the number of gaming venues, whether "brick-and-mortar" casinos or virtual internet sites. Electronic or machine games have become especially popular, providing more than 75% of total gaming revenues in many casinos.

Machine games are generally categorized as either slot games or video poker games. Slot games may be either the traditional electro-mechanical reel-spinning type, or the multiline video variety. Video poker is differentiated from a slot game in that indicia representing standard playing cards of standard rank and suits are utilized, and the gameplay allows for decision-making opportunities for the player. Whether it be slot or video poker, the wagering game generally encompasses the steps of placing a bet to play the game, determining a final outcome, and resolving any wagers according to a single predetermined paytable.

Intelligent casino table card games are systems in which cards are automatically provided or automatically read by cameras and sensing devices and wagers are automatically read by cameras or sensing devices (e.g., RFID antennae). These technologies have opened venues for the play of games in which variations are available that may be observed, controlled and executed by, software, hardware, processors and/or computers at speeds and accuracy that cannot be achieved by human activity alone.

Slot machines have evolved from having three mechanical reels with a single horizontal pay line centrally disposed on the reels to having numerous reels with a plurality of pay lines. A plurality of symbols is displayed on the reels, and specific predetermined combinations of symbols that result on a wagered pay line in the final outcome are paid according to the predetermined paytable. Although slot machine manufacturers may offer differing payback percentages for any one slot machine game, the casino generally chooses to offer only one payback percentage for any one machine. For instance, a casino may have the choice of offering a particular game on a particular machine with either a payback percentage of 94% to the player (with a casino hold of 6%), a payback percentage of 92% to the player (with a casino hold of 8%), or a payout percentage of 90% to the player (with a casino hold of 10%), and may elect to offer only the 92% payback game. However, in the case of slot machine games that allow the player to make various wagers, (i.e., one coin or multiple same coins; one lowest denomination or higher denominations; one payline or multiple paylines; or combinations thereof), a plurality of payback percentages may be provided, with the higher payback being available for the wager of larger amounts of money or credits per spin. In most cases, the particular specific payback percentage is not made available to the player. Typically only one paytable is offered for any one particular wagered game, with the difference in available payback percentages being calculated by manipulating the frequency of the occurrence of predetermined winning symbol combinations.

The Telnaes patent (U.S. Pat. No. 4,448,419) describes the most common way of mapping symbols, reels and outcomes in video gaming. The Yoseloff patents (U.S. Pat. Nos. 6,159,096, and 6,117,009) provides an alternative system for mapping symbols, reels and outcomes in video gaming. These systems provide the mechanism for establishing and performing statistical outcomes, but do not address an ability for changing probabilities based on game events.

In addition to offering different payback percentages for a particular slot machine game, the manufacturer may offer a basic game that has a plurality of variations, with each variation having similar gameplay but having a differing volatility; for example, a game "A" may pay for a predetermined set of symbol combinations, a game "B" may pay for the same said set of symbol combinations (or less combinations than the same said set of symbol combinations) with the addition of a 2× Pay symbol that will produce larger wins but with less frequency, and a game "C" may pay for the same said set of symbol combinations (or less combinations than the same said set of symbol combinations) with the addition of a 3× Pay symbol that will produce the largest wins but with the least frequency. In lieu of or in addition to changing the hit frequency, the slot machine manufacturers may either decrease or increase the payback for certain wins to provide games of different volatility. Again, each of these games "A", "B" and "C" may be offered with a plurality of differing payback percentages.

As opposed to slot machine games, video poker games are most often offered with a payback percentage based on a displayed paytable that pays predetermined amounts for specific winning hands. For instance, a final outcome of a hand consisting of a full house may pay 9-for-1; a final outcome consisting of a flush may pay 6-for-1. By examining the displayed paytable, a player is able to determine the overall payback percentage provided for that particular game using published data which is readily available in print and on the internet. A plurality of different versions of video poker are commonly available, including Jacks or Better, Bonus Poker, Deuces Wild, Joker Wild, etc. Each of these versions is available to the casino with differing paytables, which in turn provide the player with different payback percentages. Generally only one paytable is offered to the player on any one game version, although playing higher denomination games or multiple hands of a particular games may provide higher paytables. The various game versions also offer various levels of risk and volatility for the player. For instance, in the game of Jacks or Better, a pay of 3-for-1 may be paid for any 3-of-a-Kind, and 25-for-1 may be paid for any 4-of-a-Kind; in the game of Triple Double Bonus, the 3-of-a-Kind may pay only 2-for-1, while 4 Aces with a low card kicker (a 2, 3 or 4) may pay 800-for-1. Generally games with high enhanced pays for certain rare hands will also pay less for more frequently occurring hands. A larger "bankroll" is usually required to play the more volatile game versions, since the player may experience long periods of losing hands or low-paying hands until finally winning an enhanced pay hand that occurs infrequently.

Some slot machines will offer the same probabilities and odds with all wagers, except that a jackpot wager (e.g., payout for a Royal Flush in video poker games) is paid at an increased payout rate only when the maximum wager (e.g., 5 wagering units) is placed on the game. For example, the payout for a Royal Flush on a 1, 2, 3 or 4 unit bet may be 250:1, and the payout on a Royal Flush with a 5 unit wager may be 800:1 or 1000:1.

To recap the above, in known art one predetermined paytable is offered to the player for the play of any one wagered game on any one specific machine game, whether it be a slot or video poker game. The player makes a wager to play the game, the game is spun or dealt, and a final outcome is determined. Any winning symbol combination(s) or hand(s) is paid according to that predetermined paytable.

Prior art has attempted to create innovative gameplay that seeks to provide new and enticing features that overcome this commonality of machine game play.

U.S. Pat. No. 6,939,224 (Palmer) describes a gaming device comprising multiple selections having different outcomes. The probability of achieving the first outcome of a first selection is higher than a probability of achieving the first outcome of a second selection. A payout associated with the first outcome of said first selection is lower than a payout associated with the first outcome of said second selection and the probability of achieving the second outcome of said first selection is lower than a probability of achieving the second outcome of said second selection. A payout associated with the second outcome of said first selection is higher than a payout associated with the second outcome of said second selection, wherein the payouts and probabilities are configured such that a total expected value for the first selection at least approximately equals a total expected value for the second selection. A processor causes one of the selections to be selected and determines one of the outcomes for said selected selection, wherein said outcome is determined based on the probabilities associated with said selected selection, and provides a player one of the payouts based on the outcome of the selected selection.

U.S. Pat. No. 6,860,810 (Cannon) teaches a gaming apparatus and methods of conducting a wagering game of chance wherein a gaming machine is disclosed which is configured for mutually concurrent play of a plurality of games of chance on a single display screen, and wherein more than one outcome is determined. The player is provided with a plurality of differing games of chance, at least some of which are mutually concurrently payable on a single screen display of a gaming device. Mutually concurrent play of the plurality of differing games of chance is also offered on the single screen display. Multiple instances of only a single class of game, or a single type of game within a game class is also disclosed.

U.S. Pat. No. 6,708,975 (Fox) describes a card game that is preferably played with a single player playing against a single pay table. The player makes a wager for each of two or more hands that the player wishes to play. The player selects a poker hand version for each hand, with no two hands having the same poker hand version. After the player has made his wagers and the selected the poker hand versions for each hand, the computer deals out each five card hand of poker in each poker version selected by the player. The player selects none, one or more of the face up cards from each hand as cards to be held. The non-selected cards are discarded from each first hand and replacement cards are dealt face for each discarded card. The poker hand ranking of the resulting final five cards of each hand are then determined. The player is then paid a preestablished amount based on the amount of each wager if the resulting cards of each hand comprise a predetermined poker hand ranking.

U.S. Pat. No. 6,334,613 (Yoseloff) involves the potential for at least two distinct games of poker being playable from a partial hand. The player may then elect to play one or more of the potential games from at least two distinct games of poker available for play with that hand. The nature of the at least two distinct games is that at least two of the games which may be played from the partial hand require decisions to be made where a decision with regard to a election of play strategy in one poker game that is intended to have or assist in getting a positive outcome is likely to have a negative effect or comprises an adverse strategy in the play of the second game. Various pay tables are provided that differ from each other with respect to each single game.

U.S. Pat. No. 5,823,873 (Moody) discloses an electronic video gaming machine and method in which the player may play multiple hands at the same time. The player makes a wager for each separate hand to be played by the player. After an initial deal step, and after any draw and replacement steps, the final poker hand ranking of each five card hand is determined. The player is then paid for any winning poker hands based on a single pay table and the amount of the player's wager.

U.S. Pat. No. 5,911,419 (Delaney) teaches a method and apparatus for playing card wagering games that enables players to select a single playing card game to be played for a particular wagering round from among multiple playing card game options.

U.S. Pat. No. 5,816,915 (Kadlic) discloses an electronic video draw poker machine and method in which a four separate five card draw poker hands are displayed at the same time. The game allows the player to discard and draw replacement cards with respect to a particular selected five card hand in an attempt to improve that hand. After the draw step is completed, the final five card hand is compared to a single pay table based on poker hand ranking to determine if the player has achieved a winning combination.

United States Published Patent Application No. 20040017043 (Moody) permits a player to make a wager on a first round of video poker. If the player achieves a winning hand combination on the first round of video poker, the player is offered the opportunity to play one or more hands of video poker against a higher pay table on the next round of video poker. The player may continue to play against the higher pay table as long as the player continues to achieve winning combinations during each round of play. If the player fails to achieve a winning combination during a round of play, the game resets to the initial lower pay table and the player starts over.

United States Published Patent Application No. 20050096121 (Gilliland) describes an apparatus and method for displaying multiple gaming device interfaces for the same wagering game. The game can be slot although other wagering games are also within the scope of the present invention. In one embodiment, the game is played using one of a plurality of different display interfaces, wherein the gaming device enables the player to select which one interface to play. The player can play the game for a while using one interface and then switch interfaces to provide a fresh display or to change the player's luck. The player can then switch back to the original interface or select a brand new interface depending upon how many interfaces overall are provided.

It is desirable to invent new and innovative ways to provide wagering games that allow a player to make multiple wagers simultaneously so that excitement and time on machine are increased. Multiple wagers also provide that larger amounts of money will be in play, and so can increase the casino's profits. All patents and applications cited herein are incorporated in their entirety by reference.

BRIEF SUMMARY OF THE INVENTION

A wagering game is played in which a player has an option of placing a range of wagers to begin the game, such as 1 unit up to hundreds of units, and preferably between one unit and 10 units (10× the minimum wager). The player selects the amount of wager to be placed from within the range allowed. For example, with a range of 1 Unit through 5 Units available for a wager, the player selects the maximum wager of 5× the minimum wager. Upon making one of the multiple wagers available to play a single-outcome game, the effect of varying the selection of one of the multiple wagers is to play the game against one of more than one multiple predetermined paytables available for playing the game. The game is preferably a one single-outcome game (e.g., the same rules and winning combinations are available in the play of the game independent of the amount of the initial wager from within the game) and there are at least two differing paytables for the game that are offered to the player, dependent upon the amount of the wager. By a "different paytable" is meant that the payout odds for more than a single combination are different as between at least two paytables. The paytables may be for different game versions or for a single game version with differing risk levels. The payback percentage of each of the said paytables also may vary according to the amount of the wager or they may remain the same and be indicated on the apparatus or in the system as remaining the same or differing. The player makes one wager for a single paytable or make different or similar or the same wagers for each predetermined paytable to be utilized in the resolve of the wagers, the player being enabled to place the higher wager amount on a certain at least second paytable only after making a wager on the same game event on at least a first paytable. Multiple same paytables, multiple differing paytables or combinations thereof may be wagered for the play of a single game having a single outcome. The single outcome is then compared to each wagered predetermined paytable, and each wager is resolved according to that same wagered predetermined paytable.

DETAILED DESCRIPTION

Figure 1:
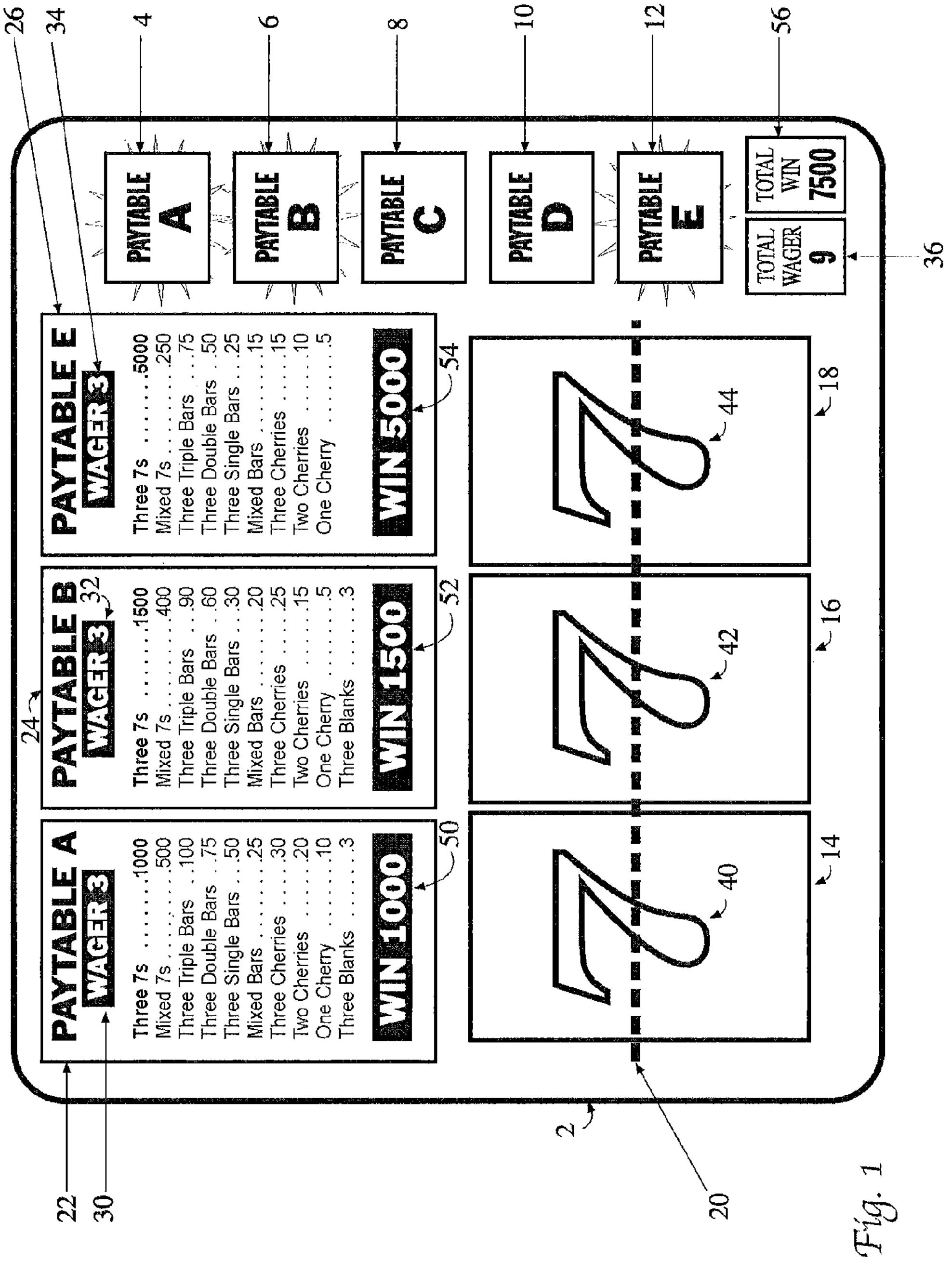
FIG. 1 shows the final outcome of a 3-reel slot game according to one embodiment of a practice of the teachings of this invention.

A wagering game is played in which a player has an option of placing a range of or a number (at least two) of different wagers to begin the game, such as 1 unit up to hundreds of units, and preferably between one unit and 10 units (10× the minimum wager). For example, the player may be able to wager numbers of units (1, 2, 3 or 5; 1, 2, 3, 4 and 5, etc.) or be able to select any amount of wager between 1 and 100 on a specific game or amongst a variety of games to begin play. The player then selects the amount of wager to be placed from within the range allowed. The selection is to be influenced according to the practices of the present technology by a fact that even if the game remains the same, the statistics and probabilities of play may (or may not) remain the same, but the wagers can be provided against varying paytables, with more than one wager being required to enable selection of a paytable with some apparent advantage to the player, such as higher payouts for same events. For example, within a range of 1 Unit through 5 Units available for a wager, the player selects the maximum wager of 5× the minimum wager. The wager may be player apportioned or automatically apportions as 3 units of wagers to a first paytable and 2 units of wager to a second paytable, or player apportioned or automatically apportioned with 2 units of wager on a first paytable, 2 units of wager on a second paytable and 1 unit of wager on a third paytable (this exemplifying that no more than equal amounts may be placed on the apparently more advantageous wagers as compared to required earlier wagers on first paytables or first and second paytables). Upon making one of the multiple wagers available to play a single-outcome game, the effect of varying the selection of one of the multiple wagers is to have portions of the total wager or individually selected amounts of the total wager played against the game and against one of more than one multiple predetermined paytables available for playing the game. The game is preferably a one single-outcome game (e.g., the same rules and winning combinations are available in the play of the game independent of the amount of the initial wager from within the game) and there are at least two differing paytables for the game that are offered to the player, dependent upon the amount and apportionment of the wager. By a "different paytable" is meant that the payout odds for more than a single combination are different as between at least two paytables. The paytables may be for different game versions or for a single game version with differing risk levels. The payback percentage of each of the said paytables also may vary according to the amount of the wager or they may remain the same and be indicated on the apparatus or in the system as remaining the same or differing. The player makes one wager for a single paytable or makes different or similar or the same wagers for each predetermined paytable to be utilized in the resolve of the wagers. The player may be enabled to place the higher wager amount on a certain at least second paytable only after making a wager on the same game event on at least a first paytable. Multiple same paytables, multiple differing paytables or combinations thereof may be wagered for the play of a single game having a single outcome. The single outcome is then compared to each wagered predetermined paytable, and each wager is resolved according to that same wagered predetermined paytable.

The game may be a table game, an electromechanical machine game, an electronic machine game or a hybrid combination of the game formats. One single-outcome game and at least two differing paytables for said game preferably are offered to the player. The single-outcome game may or may not have multiple wagerable paylines and/or multiple choices of betting a certain amount of credits per payline. The paytables may be for different game versions or for a single game version with differing risk levels. A particular machine game may be considered "risky" or "more volatile" if the payoffs for the smaller wins are less frequent or less lucrative and the payoffs for the more rare jackpot wins are larger, as opposed to a less risky game having more frequent or larger small wins and lesser-paying jackpot wins. A more volatile game usually requires a larger "bankroll"; i.e., the player needs a larger budget to keep playing, since the player may experience long periods of losing outcomes or low-paying outcomes until finally winning an enhanced pay or jackpot outcome that occurs infrequently. It would be desirable to offer the player the opportunity to make wagers on a single game against multiple varying-risk paytables so that the overall volatility is averaged and the gaming budget is stretched.

The player may or must make one initial wager for each predetermined paytable to be utilized in the resolve of the wagers. Multiple same paytables, multiple differing paytables or combinations thereof may be wagered for the play of a single game having a single outcome. The said single outcome is then compared to each wagered predetermined paytable, and each wager is resolved according to that same wagered predetermined paytable.

In a preferred embodiment, a single video wagering game is played wherein multiple differing predetermined paytables are offered. An equal wager is made to play the game according to each of at least two differing paytables to be utilized in the resolution of the wagered game, and the game is then played to a single outcome. The single outcome is resolved according to each wagered paytable.

In another embodiment, a single video wagering game is played wherein multiple differing predetermined paytables are offered and wherein multiple differing wagers may be placed on the game according to at least two differing paytables to be utilized in the resolution of the wagered game. The game is then played to a single outcome, the single outcome being resolved according to each wagered paytable.

In yet another embodiment, a single video wagering game is played wherein multiple differing predetermined paytables are offered and wherein equal wagers may be placed to play the game according to at least two paytables to be utilized in the resolution of the wagered game. Any one paytable may be utilized more than one time. The game is then played to a single outcome, the single outcome being resolved according to each wagered paytable.

In a further embodiment, a single video wagering game is played wherein multiple differing predetermined paytables are offered, the payback percentage of each of the said paytables varying according to the amount of the wager. For example, minimum wager amounts may determine the offer of paytables that provide lower payback percentages; maximum wager amounts may determine the offer of paytables that provide the highest payback percentages. Multiple same paytables, multiple differing paytables or combinations thereof may be wagered for the play of the single game having a single outcome. The said single outcome is then compared to each wagered predetermined paytable, and each wager is resolved according to that same wagered predetermined paytable.

In yet a further embodiment, a single video wagering game is played wherein the multiple differing predetermined paytables are offered that vary from low to higher payback percentages. Wager amounts may be controlled according to specific rules. For example, wager amounts on higher percentage payback paytables may or must always be equal to or less than the wager amounts on lower payback percentage paytables.

As a specific example, a traditional 3-reel slot game with one centrally-disposed payline may be offered, with a choice of predetermined paytables that vary according to risk and volatility or which are merely provided as an incentive with the same or approximately the same (e.g., ±5%) risk and volatility, in an effort to entice larger wagers on the apparatus and in the game. One paytable (Paytable A) may be determined to be the least risky, having the highest-paying frequent pays and the lowest-paying less frequent pays. Another paytable (Paytable C) may be determined to be the most risky, having the lowest-paying frequent pays, and the highest-paying less frequent pays. A third paytable (Paytable B) may be offered that has more moderate pays that are not the least risky nor the most risky. The player may make one initial wager to play the game against the riskiest paytable, one wager to play the game against the moderate paytable and one wager to play the game against the least risky paytable. The player then presses a Spin button, or otherwise engages the machine to play the game. The reels spin and a final outcome is determined by examining the symbols that fall on the single payline. If there is a winning combination on the payline, the pay for that combination is then determined according to each paytable, in this case three differing paytables. If, for instance, the win is for three red 7s, the pay may be 1000 credits according to Paytable A, 1500 credits according to Paytable B and 5000 credits according to Paytable C.

In another example, the game may be a 5-reel×3-row multiline video slot game with 9 paylines. The player is instructed to choose how many paylines to wager, how many credits to bet per payline, and which paytables to wager and play against. A first paytable may pay a small amount for a win of at least 2 symbols along a wagered payline and a large amount for a win of 5 symbols along a wagered payline. A second paytable may pay a small amount for a win of at least 3 symbols along a wagered payline and a much larger amount for a win of 5 symbols along a wagered payline. If the player chooses to play 9 paylines at 5 credits per payline against each of the two paytables, the total wager would be 45 credits per paytable, or a total of 90 credits. After the spin is completed, a final outcome is determined. If there is only one winning combination of two symbols on one of the paylines, the player would only receive a win according to the first paytable, since the second paytable requires a minimum of three symbols for a win.

In yet another example, a single hand of a video poker game is played. The player chooses to wager and play against five paytables: two same paytables of Jacks or Better, two same paytables of Bonus Poker and one paytable of Triple Double Bonus. Since Triple Double Bonus can be very volatile, the player has chosen to average the risk by also choosing to play two less volatile games at the same time. (The payback percentages of the specific paytables offered may be dependent upon the size of the wager. In addition, it should be appreciated by those knowledgeable in the art that higher payback percentages may be commonly offered, as the differing game versions may have differing optimum play decisions, and so some decisions may be compromised, resulting in lesser overall paybacks; i.e, if the correct play of one hand in one version is to hold 4 particular cards, and the correct play of the same hand in another version is to hold only 2 particular cards, then it is not possible to make both optimum play decisions for the one hand simultaneously.) After the wagers are made, one hand of 5 cards is dealt. The player chooses none or up to all cards to discard, and replacement cards are filled in to complete the draw. The final outcome is then compared to each of the wagered five paytables, and the wagers are resolved according to those same paytables. If the final outcome is a hand, of 2 Pair, the player may receive 2-for-1 wins for the Jacks or Better paytable, 2-for-1 wins for the Bonus Poker paytable, and a 1-for-1 win for the Triple Double Bonus paytable. It should be appreciated that this method of play can reduce a player's frustration of playing just one particular game version, and then receiving a winning hand that would have paid much more in a different version.

Receiving a final outcome of 4 Aces, for instance, is especially frustrating to the player who is playing only Jacks or Better, since the pay is usually only 125 credits for a 5-credit wager. Receiving that same said hand in Double Double Bonus usually pays 800 credits. Likewise, receiving the more common hands such as 2 Pair or 3-of-a-Kind may frustrate the volatile game player, since the payouts are often miserly for these hands in the more volatile games. Balancing the volatility by wagering and playing the less risky versions of a game according to a predetermined paytable at the same time as wagering and playing a more risky version of the same game having a more volatile paytable may assist the player in relieving frustration and provide more time on machine.

Reference to the Figures will assist in further understanding of the practice of the present invention.

FIG. 1 shows a monitor screen 2 having a display of the final outcome of a 3-reel slot game. Five different paytable touch-screen buttons are shown (4, 6, 8, 10, 12) with the player's specific choices of Paytable A 4, Paytable B 6 and Paytable E 12 being highlighted. Those same said Paytables are displayed in full, as shown in the upper portion of the screen as Paytable A 22, Paytable B 24 and Paytable E 26. The player has made a wager of 3 credits 30 to play the game according to Paytable A 22, a wager of 3 credits 32 to play the game according to Paytable B 24, and a wager of 3 credits 34 to play the game according to Paytable E 26, for a Total Wager of 9 credits 36. The three reels (14, 16, 18) are spun and the final outcome of three 7s (40, 42, 44) along the payline 20 is shown. Three different wins inclusive of 1000 credits 50, 1500 credits 52 and 5000 credits 54 for the outcome are displayed, each pay being resolved according to only one of the three different paytables (22, 24, 26). The Total Win of 7500 56 is displayed.

Figure 2:
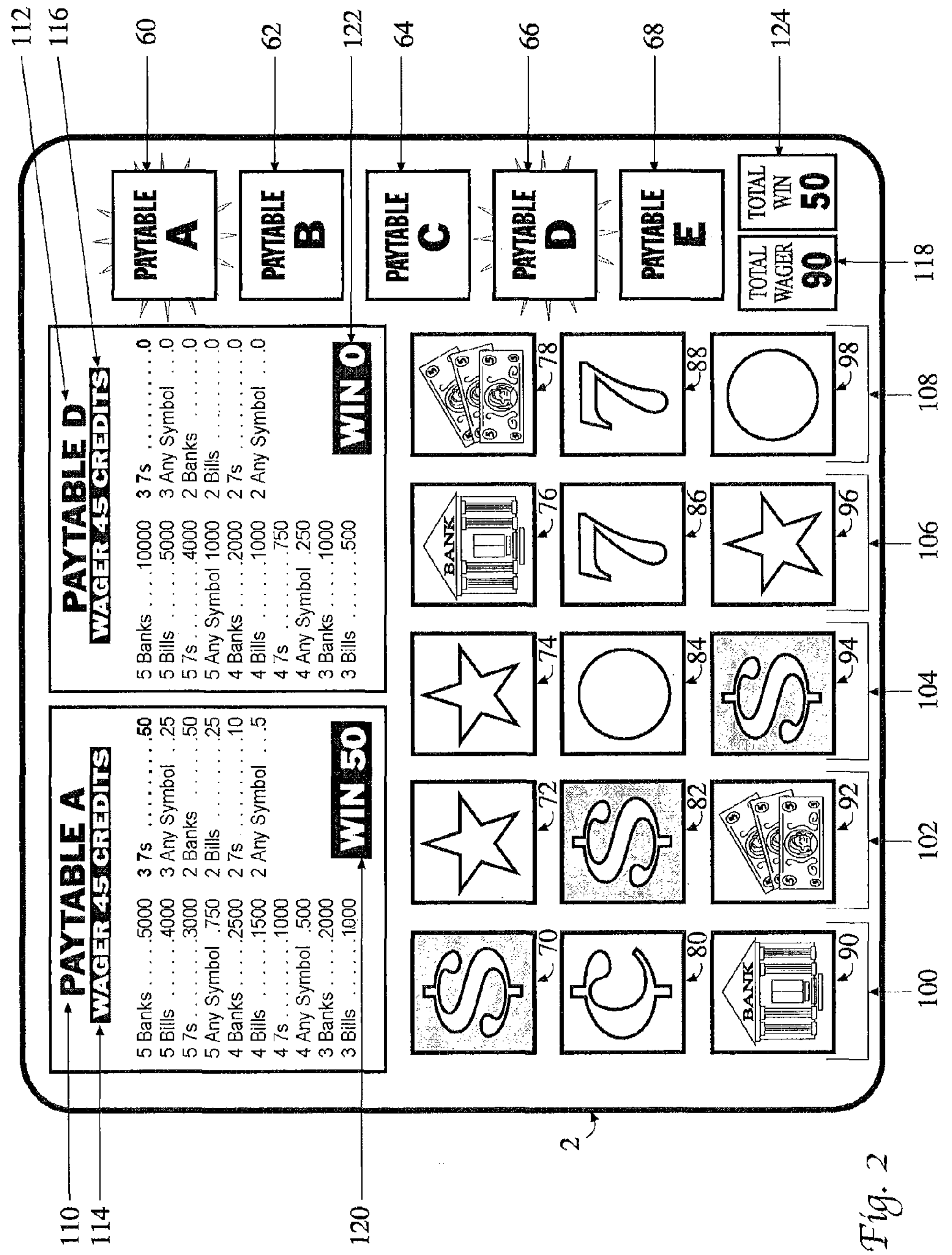
FIG. 2 shows the final outcome of a multiline slot game according to one embodiment of a practice of the teachings of this invention.

FIG. 2 shows a monitor screen 2 depicting five touch-screen buttons used for choosing Paytable A 60, Paytable B 62, Paytable C 64, Paytable D 66 and/or Paytable E 68. The Paytable A button 60 and the Paytable D 66 button are shown highlighted, representing the player's choices. The full Paytable A 110 is shown, as is the full Paytable D 112. A wager of 45 credits 114 has been placed to play the game according to Paytable A 110, and a wager of 45 credits 116 has been placed to play the game according to Paytable D 112, for a Total Wager of 90 credits 118. A multiline slot game is shown having five reels (100, 102, 104, 106, 108) and incorporating a first row of five symbols (70, 72, 74, 76, 78), a second row of five symbols (80, 82, 84, 86, 88) and a third row of five symbols (90, 92, 94, 96, 98). The final outcome shows a 3-symbol win of $70, $ 82, and $94. A win of 50 credits 120 is shown according to Paytable A 110, and a win of 0 credits 122 is shown according to Paytable D 112, for a Total Win of 50 credits 124.

Figure 3:
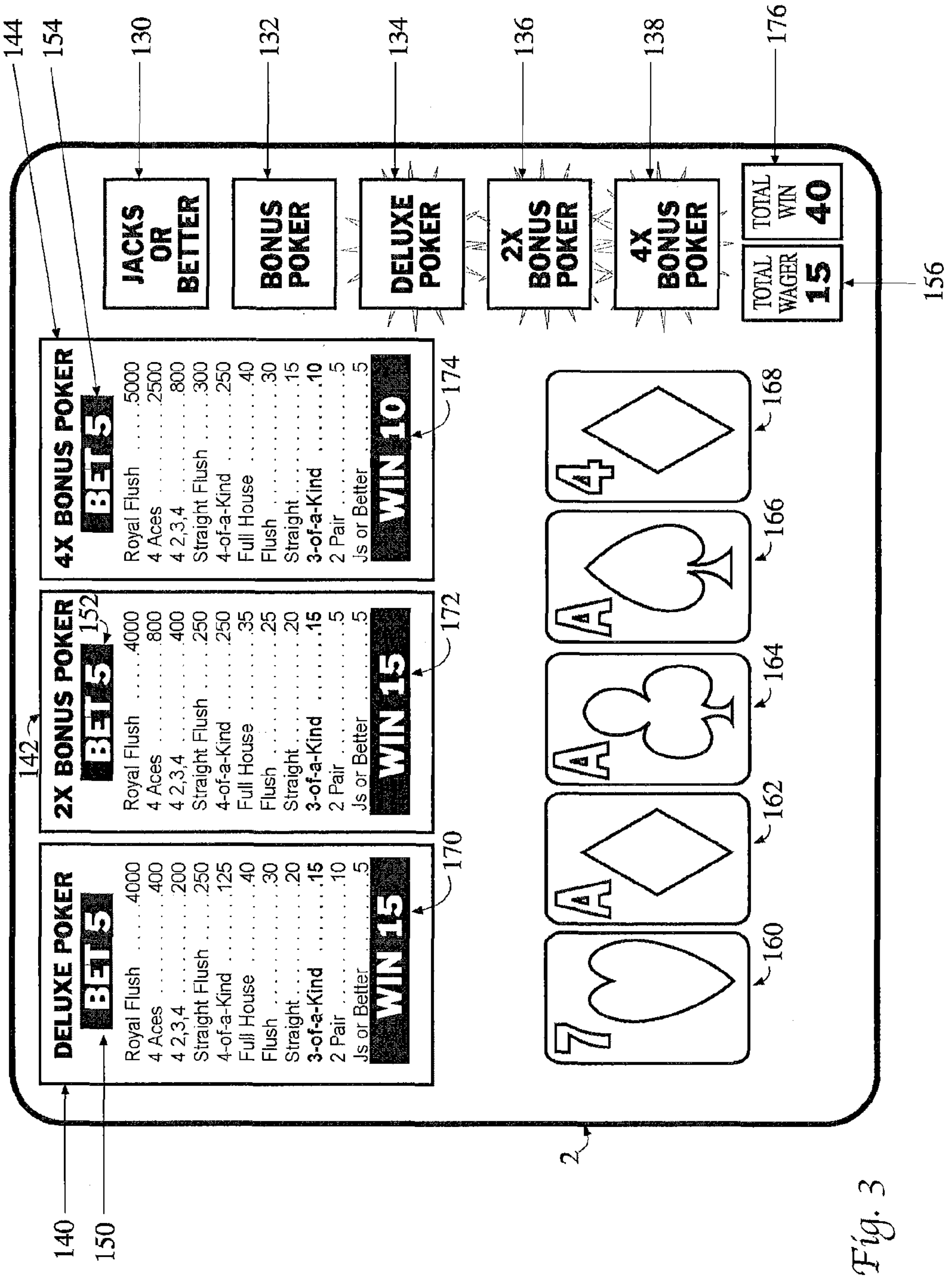
FIG. 3 shows the final outcome of a video poker game according to one embodiment of a practice of the teachings of this invention.

FIG. 3 shows a monitor screen 2 for a video poker game having five touch-screen buttons for game selection (130, 132, 134, 136, 138). The player's choice of Deluxe Poker 134, 2× Bonus Poker 136 and 4× Bonus Poker 138 are shown highlighted. The full paytable for Deluxe Poker 140, the full paytable for 2× Bonus Poker 142 and the full paytable for 4× Bonus Poker 144 are shown, as are the wagers of 5 credits (150, 152, 154) according to each paytable. The Total Wager of 15 credits 156 is also shown. A final outcome for the poker hand of 5 cards (160, 162, 164, 166, 168) is shown, incorporating 3 Aces (162, 164, 166) and having a final ranking of 3-of-a-Kind. A win of 15 credits 170 according to the Deluxe Poker paytable 140 is shown, a win of 15 credits 172 according to the 2× Bonus Poker paytable 142 is shown, and a win of 10 credits 174 according to the 4× Bonus Poker paytable 144 is shown, for a Total Win of 40 credits 176.

Although specific examples and specific paytables have been provided in this discussion, these specifics are intended to be only support for the generic concepts of the invention and are not intended to be absolute limits in the scope of the technology discussed.

Alternative examples of this technology may be shown by the use of video poker paytables, which are well recognized as varying amongst machines and amongst casinos, even with the same combinations being winning combinations. For example, examine the following three paytables in sequence.

TABLE I

| WINNING EVENT | PAYOUT |
|---|---|
| PAIR OF JACKS | 1:1 |
| TWO PAIR | 1:1 |
| THREE-OF-A-KIND | 3:1 |
| STRAIGHT | 4:1 |
| FLUSH | 5:1 |
| FULLHOUSE | 7:1 |
| FOUR-OF-A-KIND | 25:1 |
| STRAIGHT FLUSH | 50:1 |
| ROYAL FLUSH | 250:1 |

TABLE II

| WINNING EVENT | PAYOUT |
|---|---|
| PAIR OF JACKS | 1:1 |
| TWO PAIR | 2:1 |
| THREE-OF-A-KIND | 3:1 |
| STRAIGHT | 4:1 |
| FLUSH | 5:1 |
| FULLHOUSE | 8:1 |
| FOUR-OF-A-KIND | 25:1 |
| STRAIGHT FLUSH | 50:1 |
| ROYAL FLUSH | 250:1 |

TABLE III

| WINNING EVENT | PAYOUT |
|---|---|
| PAIR OF JACKS | 1:1 |
| TWO PAIR | 2:1 |
| THREE-OF-A-KIND | 3:1 |
| STRAIGHT | 5:1 |
| FLUSH | 6:1 |
| FULLHOUSE | 8:1 |
| FOUR-OF-A-KIND | 25:1 |
| STRAIGHT FLUSH | 50:1 |
| ROYAL FLUSH | 300:1 |

As can be readily seen, there are at least two payouts in Table II that are different (all higher) than the payouts in Table I. Additionally, there are at least two payouts in Table III that are higher than at least two payouts in Tables I and II. There are or may be individual machines that provide payout schedules similar to or identical to the payout rates shown in any of the tables, but those are essentially consistent rates, independent of the amount of the wager.

In the play of the game according to one embodiment of the present technology, the player may have the option of (for example) wagering 15 units of wagers. If the player makes a wager of a single unit, the wager must be placed on Table I (e.g., identified in shorthand as "I-1"). If the player makes a wager of two units, the wagers may be apportioned as one unit to Table I (I-1) and one unit to Table II (II-1). If the player makes a wager of three units, the units may be apportioned as either of one unit to each table (I-1, II-1 and III-1) or two units to the first Table and one unit to the second Table (I-2 and II-1). If the player makes a wager of four units, the units may be apportioned as either of two units to Table I and one unit to each of Tables I and III (I-1, II-1 and III-1) or two units to the first Table and two units to the second Table (I-2 and II-2). If the player makes a wager of five units, the units may be apportioned as either of three units to Table I and two units to Table II (I-3, II-2) or three units to the first Table I and one unit to each of the second and the third Tables (I-3, II-1, III-1), or two units to Table I, two units to Table II and one unit to table III (I-2, II-2 and III-1). In this way, the amounts of wagers on secondary tables is always less than or equal to wagers on the primary table. A “secondary table” as used herein means a table that can be wagered on or have wagers applied to only after a wager has been placed on a primary table or default table. A “primary table” is a table in which when there is a first single unit wager, that wager is applied against that primary or default table. In the above descriptions, this is analogous to Table I. Table II is a first secondary table and Table III is a secondary table or a tertiary table, as it can be wagered on only after a wager of at least equal value has been made on the secondary table.

Another way of describing the present technology is as a method of playing casino game in which a player places at least one wager against a first paytable. The player places a first wager of at least one wagering unit against the first paytable to receive a set of at least one symbol. The player receives at least one symbol after placing the first wager. If the at least one symbol and any additional symbols received by the player attain a count, rank, pattern, orientation or distribution predetermined in the paytable, the player receives a first payment in the resolution of the game. Further, if the player places more than one wagering unit in the first wager or places additional wagering units in addition to the at least one wagering unit or an additional wager of more than the at least one wagering unit before the player receives the at least one symbol, at least some of the additional wagering units or at least some wagering units above the amount of the at least one wagering unit are played against a second paytable having at least one second payment in the resolution of the game that is higher than the first payment in the resolution of the game in the first paytable for the same count, rank, pattern, orientation or distribution predetermined in the first paytable, the first payment and the second payment being determined at the end of the game. The method may have the count, rank, pattern, orientation or distribution predetermined in the first paytable as the same as the count, rank, pattern, orientation or distribution predetermined in the second paytable. The method may have the first payment and the second payment determined at approximately the same time at the end of the game (approximately denotes the reality of processors doing work quickly, but not necessarily instantaneously, or allowing a dramatic pause as first one resolution or determination occurs and then a second or third resolution occurs. The method may have a first paytable, a second paytable and a third paytable, and the third paytable may have at least one third payment in the resolution of the game that is higher than the second payment in the resolution of the game in the second paytable for the same count, rank, pattern, orientation or distribution predetermined in the second paytable, the third payment and the second payment being determined at the end of the game. The method may provide that the amount of unit wagers that may be placed on the second paytable is always less than or equal to the amount of unit wagers that is placed on the first wager. Similarly, the method may provide that the amount of unit wagers that may be placed on the third paytable is always less than or equal to the amount of unit wagers that is placed on the second paytable.

In the practice of this technology, there are many alternatives that can be practiced beyond the examples given above to support the generic concepts of the technology. As further non-limiting examples of practices that can be done, the following should be considered. The system can provide differing paytables for the same game (e.g., SuperDuper 7s™, for instance), with changes in volatility such as variations from low to high volatility, but with all the same approximate return (90%, −100%, with 94% as an example). The lower paying jackpot paytable may have higher or more frequent small wins. The higher paying jackpot may have less frequent or more meager small pays. Wagers can be equal or different in this and other versions, with the rules and systems controlling the distribution of wagers. The system can provide differing paytables for a same game (Deuces Wild Poker for instance) that each have a different payback percentage (Paytable A pays back 92%, Paytable B pays 94%, C pays 96%) and the different payback percentages can be identified on the charts or merely identified as 1$^{st}$ payback level, higher payback level and highest payback level. This version may require players to bet more on the low-paying paytable. The system can provide different versions of a particular kind of generic game (video poker for instance) where the player can play Jacks or Better, Triple Double Bonus and Deuces Wild simultaneously, for instance. A paytable could be offered for each version.

Maximum wagers in any of the above versions may give the player better-paying paytables. Unlimited numbers or amounts of paytables or versions can be played as only the processor memory limits the number of wagers and games.

The above technologies have been described primarily with regard to video gaming apparatus, but may be applied, as already indicated, to physical reel apparatus, automated tables, hybrid tables and the like. These and other variations, substitutions and equivalents are intended to be included within the scope of the disclosure and the scope of the claims appended hereto.

The invention is claimed as follows:

1. A method of operating a gaming device, said method comprising:

causing a processor to operate with a display device and an input device to enable a player to select a quantity of paytables from a plurality of different paytables for use in a single play of a wagering game, said quantity of paytables being at least two;

causing the processor to operate with the display device and the input device to, for each of the selected paytables, enable the player to place a wager associated with said selected paytable for the single play of the wagering game; and after receiving the wagers, causing the processor to operate with the display device to:

(a) randomly generate a plurality of symbols from a set of different symbols for the single play of the wagering game;

(b) display the generated symbols;

(c) for each selected paytable, evaluate the generated symbols according to said paytable and the wager associated with said paytable, and determine any award associated with the generated symbols based on said paytable and said wager; and (d) cause any determined awards to be provided to the player.

2. The method of claim 1, which includes causing the processor to operate with the display device to display an indication of each of the plurality of different paytables before enabling the player to select the quantity of paytables from the plurality of different paytables.

3. The method of claim 1, which includes causing the processor to operate with the display device to display each of the plurality of different paytables before enabling the player to select the quantity of paytables from the plurality of different paytables.

4. The method of claim 1, which includes causing the processor to operate with the display device and the input device to, for each selected paytable, enable the player to place the wager associated with said paytable after the player has selected the quantity of paytables from the plurality of different paytables.

5. The method of claim 1, which includes causing the processor to operate with the display device and the input device to enable the player to select a predetermined quantity of paytables from the plurality of different paytables for use in the single play of the wagering game, said predetermined quantity of paytables being at least two.

6. The method of claim 1, which includes causing the processor to operate with the display device and the input device to enable the player to place an equal wager associated with each selected paytable for the single play of the wagering game.

7. The method of claim 6, which includes causing the processor to operate with the display device and the input device to enable the player to select at least two different paytables from the plurality of different paytables for use in the single play of the wagering game.

8. The method of claim 1, which includes causing the processor to operate with the display device and the input device to enable the player to select at least two different paytables from the plurality of different paytables for use in the single play of the wagering game.

9. The method of claim 1, which includes, for each selected paytable, causing the processor to vary the awards associated with the generated symbols based on said paytable and the wager associated with said paytable.

10. The method of claim 1, wherein the wagering game is five card video poker, wherein the generated symbols represent a five card poker hand.

11. The method of claim 10, wherein the plurality of different paytables includes: Jacks or Better, Bonus Poker, Double Bonus Poker, Double Double Bonus Poker, and Triple Double Bonus Poker.

12. A gaming device comprising:

a display device;

an input device; and a processor configured to operate with the display device and the input device to:

enable a player to select a quantity of paytables from a plurality of different paytables for use in a single play of a wagering game, said quantity of paytables being at least two;

for each of the selected paytables, enable the player to place a wager associated with said selected paytable for the single play of the wagering game; and after receiving the wagers:

(a) randomly generate a plurality of symbols from a set of different symbols for the single play of the wagering game;

(b) display the generated symbols;

(c) for each selected paytable, evaluate the generated symbols according to said paytable and the wager associated with said paytable, and determine any award associated with the generated symbols based on said paytable and said wager; and (d) cause any determined awards to be provided to the player.

13. The gaming device of claim 12, wherein the processor is configured to operate with the display device to display an indication of each of the plurality of different paytables before enabling the player to select the quantity of paytables from the plurality of different paytables.

14. The gaming device of claim 12, wherein the processor is configured to operate with the display device to display each of the plurality of different paytables before enabling the player to select the quantity of paytables from the plurality of different paytables.

15. The gaming device of claim 12, wherein the processor is configured to operate with the display device and the input device to, for each selected paytable, enable the player to place the wager associated with said paytable after the player has selected the quantity of paytables from the plurality of different paytables.

16. The gaming device of claim 12, wherein the processor is configured to operate with the display device and the input device to enable the player to select a predetermined quantity of paytables from the plurality of different paytables for use in the single play of the wagering game, said predetermined quantity of paytables being at least two.

17. The gaming device of claim 12, wherein the processor is configured to operate with the display device and the input device to enable the player to place an equal wager associated with each selected paytable for the single play of the wagering game.

18. The gaming device of claim 17, wherein the processor is configured to operate with the display device and the input device to enable the player to select at least two different paytables from the plurality of different paytables for use in the single play of the wagering game.

19. The gaming device of claim 12, wherein the processor is configured to operate with the display device and the input device to enable the player to select at least two different paytables from the plurality of different paytables for use in the single play of the wagering game.

20. The gaming device of claim 12, wherein the processor is configured to, for each selected paytable, vary the awards associated with the generated symbols based on said paytable and the wager associated with said paytable.

21. The gaming device of claim 12, wherein the wagering game is five card video poker, wherein the generated symbols represent a five card poker hand.

22. The gaming device of claim 21, wherein the plurality of different paytables includes: Jacks or Better, Bonus Poker, Double Bonus Poker, Double Double Bonus Poker, and Triple Bonus Poker.

* * * * *